(12) United States Patent
Karner

(10) Patent No.: US 8,566,148 B2
(45) Date of Patent: Oct. 22, 2013

(54) ONBOARD UNIT AND METHOD FOR CHARGING OCCUPANT NUMBER-DEPENDENT TOLLS FOR VEHICLES

(75) Inventor: Georg Karner, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 76 days.

(21) Appl. No.: 13/294,552

(22) Filed: Nov. 11, 2011

(65) Prior Publication Data

US 2012/0143786 A1 Jun. 7, 2012

(30) Foreign Application Priority Data

Dec. 7, 2010 (EP) ..................................... 10450188

(51) Int. Cl.
*G07B 15/00* (2011.01)
*G07B 15/02* (2011.01)
*G06Q 10/00* (2012.01)
*G06Q 30/00* (2012.01)
*G06F 17/00* (2006.01)
*G06G 7/00* (2006.01)

(52) U.S. Cl.
USPC .............. 705/13; 705/1.1; 705/7.35; 705/400

(58) Field of Classification Search
USPC ..................... 705/1.1, 13, 7.35, 400; 280/735
See application file for complete search history.

(56) References Cited

U.S. PATENT DOCUMENTS

| | | | |
|---|---|---|---|
| 5,573,012 A * | 11/1996 | McEwan ....................... | 600/595 |
| 7,134,687 B2 | 11/2006 | Breed et al. | |
| 2001/0042977 A1* | 11/2001 | Breed et al. ................... | 280/735 |
| 2011/0137773 A1* | 6/2011 | Davis et al. .................... | 705/34 |

FOREIGN PATENT DOCUMENTS

| | | |
|---|---|---|
| DE | 103 12 946 A1 | 9/2004 |
| DE | 10 2005 020 847 A1 | 11/2006 |

OTHER PUBLICATIONS

Extended European Search Report for European Application No. 10450188.7 dated May 17, 2011, 6pp.
Ungemah, David et al.; "Automated Vehicle Occupancy Verification Systems: Policy and Legal Implications", Transportation Research Record: Journal of the Transportation Research Board; No. 2065; 2008; pp. 41-46.
Goodin G; "Violations Enforcement Summit Passage"; XP007918560; 5pp.
Silvious, Jerry et al.; "UHF Measurement of Breathing and Heartbeat at a Distance"; IEEE Radio and Wireless Symposium 2010, pp. 567-570.
Mostafanezhad, Isar et al.; "A Coherent Low IF Receiver Architecture for Doppler Radar Motion Detector Used in Life Signs Monitoring"; IEEE Radio and Wireless Symposium 2010, pp. 571-574.

(Continued)

*Primary Examiner* — George Chen
(74) *Attorney, Agent, or Firm* — Christie, Parker & Hale, LLP

(57) ABSTRACT

Onboard unit for charging occupant number-dependent tolls for a vehicle in the context of a road toll system, comprising a Doppler radar or UWB impulse radar that can be directed onto the vehicle interior for measuring movements and generating at least one measurement signal representing these; and an evaluation device, which is configured to detect signal patterns in the measurement signal that are typical for heart or respiratory activity of an occupant, to count those signal patterns which occur simultaneously at an observation time, and to calculate toll data as a function of that count value.

13 Claims, 3 Drawing Sheets

(56) References Cited

OTHER PUBLICATIONS

Ohta, Kyohei et al.; "Wireless Motion Sensor Using Ultra-Wideband Impulse-Radio"; IEEE Radio and Wireless Symposium 2010, pp. 13-16.

"Automated Vehicle Occupancy Monitoring Systems for HOV/HOT Facilities—Final Report", McCormick Ranking Corporation, Ontario, Canada, Dec. 2004.

Schijns, Steven et al.; "A Breakthrough in Automated Vehicle Occupancy Monitoring Systems for HOV/HOT Facilities"; 12$^{th}$ HOV Systems Conference Houston, Texas, Apr. 20, 2005.

Goodin, Ginger; "Verifying Vehicle Occupancy for HOT Lanes—A path Toward Automated Systems"; Violations Enforcement Summit, Boston, Massachusetts, Jul. 20-31, 2007.

Goodin, Ginger et al.; "Out for the Count—Verifying Vehicle Occupancy: Prospects for an Automated Solution"; Tolltrans 2009, pp. 44-49.

Office action issued on Jul. 30, 2013 in corresponding Chilean Patent Application No. 2011-003092, 7pp.

* cited by examiner

ONBOARD UNIT AND METHOD FOR CHARGING OCCUPANT NUMBER-DEPENDENT TOLLS FOR VEHICLES

CROSS-REFERENCE TO RELATED APPLICATION(S)

This application claims priority to European Patent Application No. 10 450 188.7, filed on Dec. 7, 2010, the contents of which are hereby expressly incorporated by reference.

FIELD OF THE INVENTION

The present invention relates to an onboard unit and a method for charging occupant number-dependent tolls for vehicles in the context of a road toll system.

BACKGROUND

The charging of tolls for vehicles dependent on the number of their occupants is frequently used as a policy measure to regulate traffic density. A preferred application relates to high occupancy toll (HOT) lanes, which are road lanes actually reserved for vehicles with multiple occupants (high occupancy vehicles (HOV)), but may also be used by vehicles with fewer occupants so long as an appropriate occupant-dependent toll is paid for the usage.

To prevent the risk of violation associated with a self-declaration of the occupant number or the risk of error associated with a visual check by control personnel, electronic toll systems are being increasingly used that automatically detect the number of occupants and calculate a toll dependent thereon. These systems use electronic onboard units (OBUs) equipped with occupant detectors.

An overview of currently available systems is given in the publications "Automated Vehicle Occupancy Monitoring Systems for HOV/HOT Facilities—Final Report", McCormick Ranking Corporation, Ontario, Canada, December 2004; Steven Schijns and Paul Matthews: "A Breakthrough in Automated Vehicle Occupancy Monitoring Systems for HOV/HOT Facilities", 12$^{th}$ HOV Systems Conference Houston, Tex., 20 Apr. 2005; Ginger Goodin: "Verifying Vehicle Occupancy for HOT Lanes—A path Toward Automated Systems", Violations Enforcement Summit, Boston, Mass., 20-31 Jul. 2007; and Ginger Goodin and John P. Wikander: "Out for the Count—Verifying Vehicle Occupancy: Prospects for an Automated Solution", Tolltrans 2009, pages 44-49. The known systems propose, inter alia, weight, thermal, infrared, ultrasonic or radar sensors to detect the presence of occupants or biometric sensors to detect fingerprints, faces, heartbeat or lung functions of occupants. For the latter measurements, electrical sensors or pressure sensors have been used hitherto that measure flows within the body of the occupants or respiratory pressure fluctuations.

Radar sensors that can detect the weak periodic movements of the human body on the basis of vital functions such as heartbeat and breathing have recently been developed to detect the layout of occupant seating for intelligent airbag control ("smart airbags"). These radar sensors use either CW Doppler radar in the ultra-high frequency continuous-wave Doppler radar (UHF) range, or the new system of ultra-wideband (UWB) impulse radar (UWB-IR), which can measure the rhythmic movements of the chambers of the heart or lobes of the lungs in a non-contact manner through media such as clothing and body layers. For the theoretical basic principles of these sensors reference is made to the following publications that are expressly incorporated herein by reference: Jerry Silvious and David Tahmoush: "UHF Measurement of Breathing and Heartbeat at a Distance", IEEE Radio and Wireless Symposium 2010, pages 567-570; Isar Mostafanezhad, Olga Boric-Lubecke and Victor Lubecke: "A Coherent Low IF Receiver Architecture for Doppler Radar Motion Detector Used in Life Signs Monitoring", IEEE Radio and Wireless Symposium 2010, pages 571-574; and also Kyohei Otha, Katsushi Ono, Isamu Matsunami and Akihiro Kajiwara: "Wireless Motion Sensor Using Ultra-Wideband Impulse-Radio", IEEE Radio and Wireless Symposium 2010, pages 13-16. Special applications of such Doppler radar and UWB impulse radar sensors for airbag control are described, for example, in patent publications US 2001/0042977 A1, DE 10 2005 020 847 A1 and U.S. Pat. No. 7,134,687 B2.

SUMMARY

The present invention provides a new solution on the basis of known technologies for charging occupant number-dependent tolls for vehicles in road toll systems, which enables the advantages of a non-contact occupant measurement system using biometric radar sensors.

In some embodiments, the present invention is an onboard unit, comprising a Doppler radar or UWB impulse radar directed onto the vehicle interior for measuring movements and generating at least one measurement signal representing the moments; and an evaluation device configured to detect signal patterns in the at least one measurement signal that are typical for heart or respiratory activity of an occupant, to count those signal patterns which occur simultaneously at an observation time, and to calculate toll data as a function of that count value.

In some embodiments, the present invention is a method for charging occupant number-dependent tolls for vehicles in the context of a road toll system. The method comprising directing a Doppler radar or UWB impulse radar onto a vehicle interior to measure movements therein and to generate at least one measurement signal representing the movements; detecting signal patterns in the measurement signal that are typical for heart or respiratory activity of an occupant; counting signal patterns which occur simultaneously at an observation time; and calculating toll data as a function of that count value.

The invention allows a non-contact and accurate method that is not susceptible to interference for determining an occupant number-dependent toll by detection of the vital functions of heartbeat and/or breathing of the individual occupants. Violation attempts by occupants, errors by control personnel and measurement errors through occlusions or foreign objects are thus substantially excluded. As a result, an almost 100% toll charging rate can be achieved, e.g. in HOT lanes.

In some embodiments of the invention, the count values of multiple consecutive observation times are averaged to form a mean value and the toll data are calculated from this mean value, and the evaluation device is also configured to perform this averaging function. This prevents interference through temporary measurement errors or parasitic included measurements, for example, of occupants of an adjacent vehicle, passers-by etc. that are by chance included in detection by the stray field of the Doppler radar or UWB impulse radar. Situations where such instances of interference increasingly occur are, for example, intersections at which multiple vehicles come to a halt, or when multiple vehicles are moving forward at the same speed in parallel lanes. In this case, vehicles are in direct local proximity to one another over a limited period of time, and therefore the vehicle sensor cannot reliably assign the location of the persons in the respective vehicle. Such instances of temporary interference are cut out by averaging over a longer observation period.

To suppress interference during counting, only those signal patterns are taken into account that on an average over multiple observation times indicate no relative speed of the occupant causing the respective signal pattern. Therefore, according to the invention, the inherent speed or acceleration of the persons to be detected is also taken into account. That is, inside the vehicle with the sensor, the component of inherent speed of the measurement signal is zero and other vehicles have different inherent speeds at least intermittently. The detected signal patterns can therefore be compared at identical inherent speeds to the inherent speed of the vehicle to reach a reliable match of the selected occupants to the respective vehicle.

In some embodiments, the time averaging is initiated at a geographical position, e.g., the start of a HOT/HOV lane, in which only the occupants of one vehicle are clearly measured as a result of a structural separation (e.g., separation of a road lane). Consequently, the observation time or times are started when the vehicle reaches a predetermined position, for which purpose the onboard unit has a corresponding position determination system, e.g., a satellite navigation receiver.

In some embodiments, the speed of the vehicle is measured, the acceleration phases are averaged therefrom and the observation times are selected in the acceleration phases of the vehicle. It is highly unlikely in such acceleration phases that foreign vehicles travelling parallel are moving at the same speed and therefore occupants of foreign vehicles, which thus have (average) relative speeds other than zero, can be separated easily.

To prevent instances of interfering radiation and interfering measurements, the antenna characteristic of the Doppler radar or UWB impulse radar may be matched to the vehicle interior.

In some embodiments of the invention, for each seat of the vehicle, the Doppler radar or UWB impulse radar has its own transceiver antenna that can be directed thereto for generating its own measurement signal, in which the signal patterns can be detected separately according to occupant. This variant increases the hardware expenditure on the high-frequency side of the onboard unit, but also simplifies the signal processing in the signal processor part of the onboard unit.

In some embodiments of the invention, the Doppler radar or UWB impulse radar has a joint transceiver antenna for the entire vehicle interior for generating a joint measurement signal, in which simultaneously occurring signal patterns can be detected by a correlation comparison with predetermined reference signal patterns. This variant simplifies the high-frequency side of the onboard unit at the cost of increased complexity of the signal processor part.

The toll data calculated dependent on the number of occupants can be stored in the onboard unit for later retrieval or can be used directly to debit a credit account stored on a credit balance card of the onboard unit. In some embodiments of the invention, the calculated toll data are transmitted to a central of the road toll system by a transceiver connected to the evaluation device in the onboard unit for communication of the toll data calculated dependent on the number of occupants from the onboard unit to at least one radio beacon of the road toll system.

DETAILED DESCRIPTION

Figure 1:
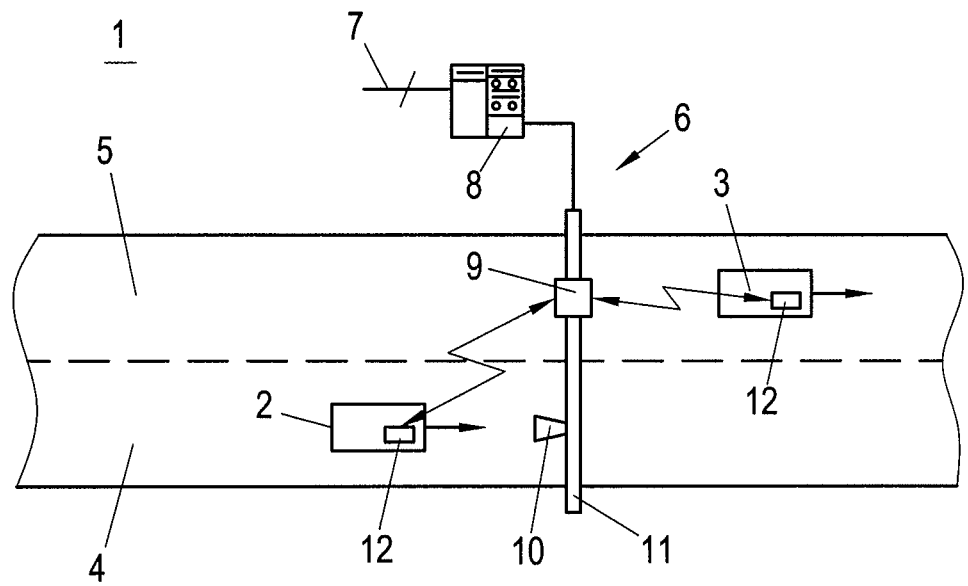
FIG. 1 is a schematic overview of a road toll system, according to some embodiments of the invention.

FIG. 1 shows an exemplary sectional view of a road toll system 1, within which vehicles 2, 3 are moving on road lanes 4, 5. The road toll system 1 comprises, for example, a plurality of roadside radio beacons 6, which can connect to a central control unit (not shown) of the road toll system 1 by means of data lines 7. The radio beacons 6 (roadside equipment, RSE) comprise, for example, a local computer 8 with a transceiver 9 and at least one camera 10, which are supported by an installation bridge 11 spanning the road lanes 4, 5, connected thereto.

The vehicles 2, 3 are equipped with onboard unit (OBUs) 12, which can enter into radio communication with the transceivers 9 of the radio beacons 6 in order to pass toll data to the road toll system 1 that result in corresponding toll transactions therein. The camera 10 can be actuated by the computer 8 to prepare images of vehicles 2, 3 that commit toll violations, e.g. because of missing or incorrectly set OBUs 12, or in the case of inadequate account funds for payment of the toll charges resulting from the toll data, etc.

The radio beacons 6 and OBUs 12 can communicate, for example, according to the DSRC (dedicated short-range communication) or WAVE (wireless access in a vehicle environment) standards. Instead of the shown road toll systems 1, for example, a GNSS/PLMN (global navigation satellite system/public land mobile network) road toll system can be used, in which OBUs 12 located with the aid of satellite send toll data (e.g., inclusive position data) via a mobile radio network.

The toll charges in the road toll system 1 are determined at least on the basis of the number of occupants of a vehicle 2, 3, for example, for use of a "HOT lane" as the lane 4 for which an increased toll charge is to be paid when the vehicle 2 has a small number of occupants. To enable the toll charges to be calculated automatically and dependent on the number of occupants, the OBU 12 is equipped with an occupant detector that counts the number of vehicle occupants, as explained in more detail below.

Figure 2:
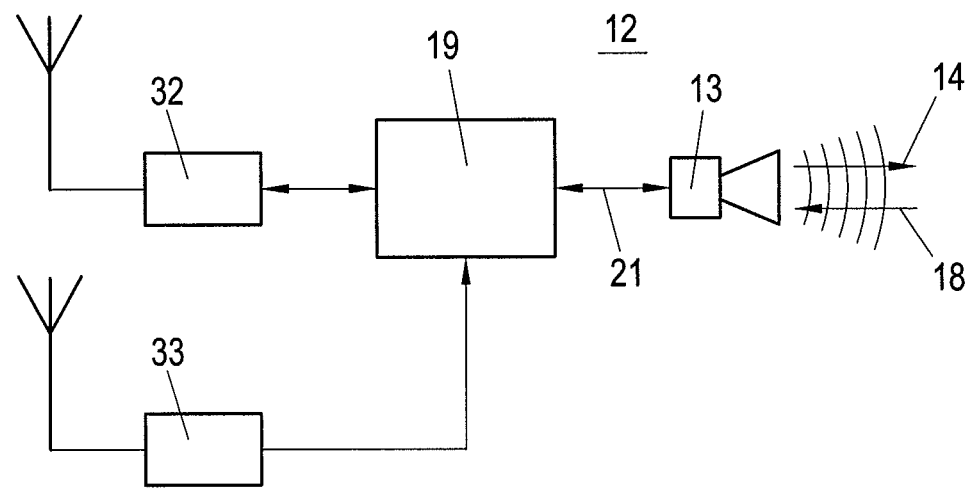
FIG. 2 is a block diagram of an onboard unit, according to some embodiments of the invention.
Figure 3:
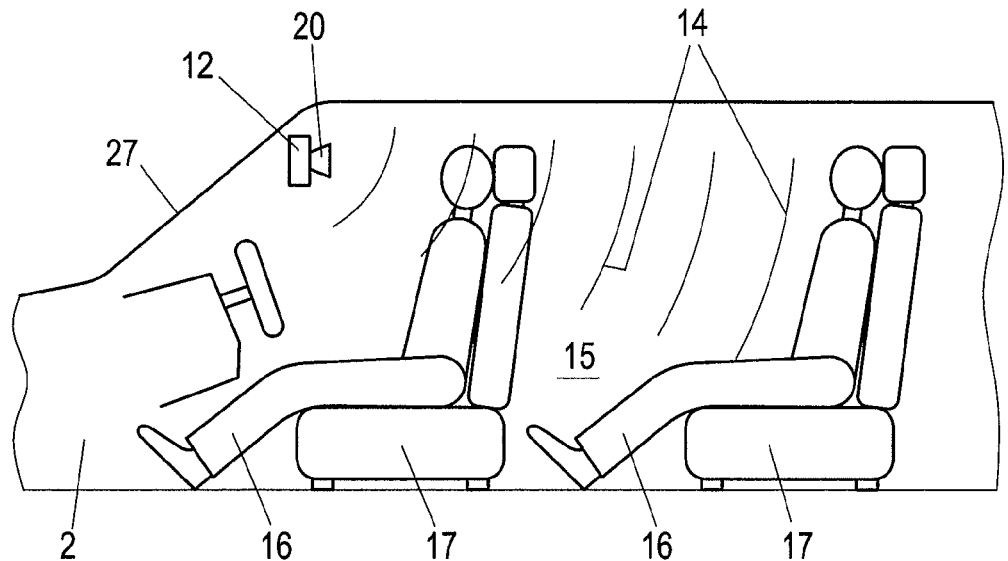
FIGS. 3 and 4 show the interior of a vehicle equipped with different embodiments of an onboard unit of the invention in side view and plan view respectively, according to some embodiments of the invention.
Figure 4:
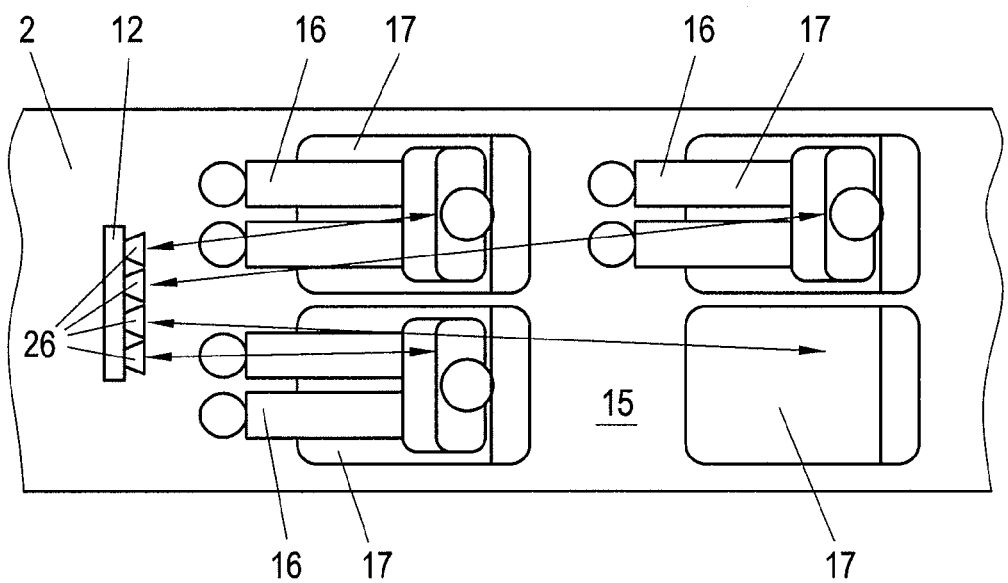
Figure 7:
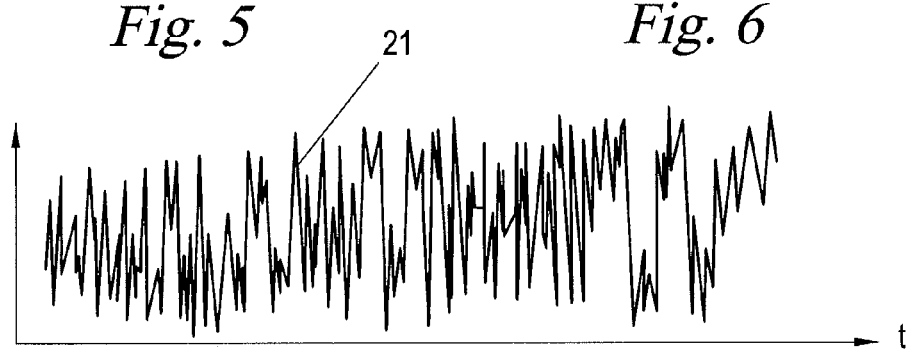
FIG. 7 shows an exemplary measurement signal of a UWB impulse radar of the onboard unit of the invention, according to some embodiments of the invention.

As shown schematically in FIGS. 2 to 4, the OBU 12 is equipped with a continuous wave (CW) Doppler radar or ultra-wideband (UWB) impulse radar 13, which transmits radar waves 14 to the vehicle interior 15, more precisely onto occupants 16 on vehicle seats 17, and receives reflected radar waves 18 therefrom. For this purpose, the OBU 12 can be fastened, for example, on the inside of the windscreen 27 of the vehicle 2, 3. The radar 13 enables movements in the vehicle interior 15 to be measured and a measurement signal 21 representative thereof (see also FIG. 7) to be generated for an evaluation device 19 of the OBU 12.

The two mentioned types of radar, i.e., both UHF-CW Doppler radar and UWB impulse radar, have an extremely high sensitivity and extremely fine local resolution in the millimetre range and can penetrate materials such as clothing and skin layers, so that even the slight movements of the heart chambers, arteries, lobes of the lungs, etc. of the human body can be measured. In the case of Doppler radar, the Doppler effect-based frequency or phase shifts between the transmitted and reflected radar waves 14, 18 are measured. In the case of UWB, impulse radar the pulse time-delay of extremely short radio pulses in the nanosecond range, which have a very wide-band spectrum in the frequency range, are measured when they are reflected on targets such as the occupants 16 in order to detect distances and changes therein. With respect to the theory and mode of operation of the CW Doppler radar and UWB impulse radar, reference is made to the aforementioned publications, the disclosure content of which is expressly incorporated herein by reference.

Figure 5:
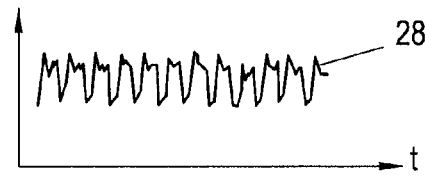
FIGS. 5 and 6 show reference signal patterns of radar measurements of the body movements of an occupant based on respiratory activity (FIG. 5) and heartbeat (FIG. 6)
Figure 6:
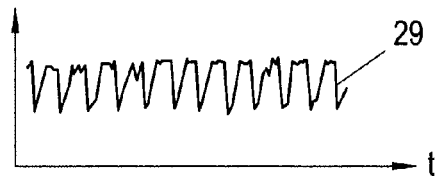

FIG. 5 shows an exemplary measurement signal 18 recorded using a UHF-CW Doppler radar 13 from the movements of the upper ribcage of an occupant 16 showing the breathing activity of this occupant. FIG. 6 shows an exemplary measurement signal 29 displayed using a UWB Doppler radar 13 from the movements of the carotid artery of an occupant 16 representing the heartbeat of this occupant. Signal patterns such as those shown in FIGS. 5 and 6 can be determined in reference measurements and can be stored as reference signal patterns typical of a heart or respiratory activity of an occupant in a memory of the radar 13 or the OBU 12 for use in further evaluation processes.

In the embodiment of FIG. 3, the radar 13 has a joint transceiver antenna 20 for the entire vehicle interior 15 that detects and measures all occupants 16 simultaneously. The measurement signal 21 sent by the radar 13 to the evaluation device 19 is therefore a mixture of all movement, heart and respiratory activity signal patterns received from all occupants 16, shown by way of example in FIG. 7, which shows the movement patterns of multiple occupants simultaneously.

The evaluation device 19 detects the best possible signal patterns of the individual occupants 16 (the best fit) in the measurement signal 21, by corresponding correlation with the known reference signal patterns 28, 29 in order to separate overlapping signal patterns from one another. The separated signal patterns 22-25 are plotted in FIG. 8 as individual tracks in relation to time t.

It is understood that the division of the individual detected signal patterns into tracks 22-25 may not be possible in full, i.e., transpositions can occur with respect to the tracks, but a "best fit" action is conducted again to fill the tracks in the best possible manner. However, any transpositions are inconsequential for the further process since it is largely only the number of simultaneously detected signal patterns that is important, not their assignment to individual persons.

Figure 8:
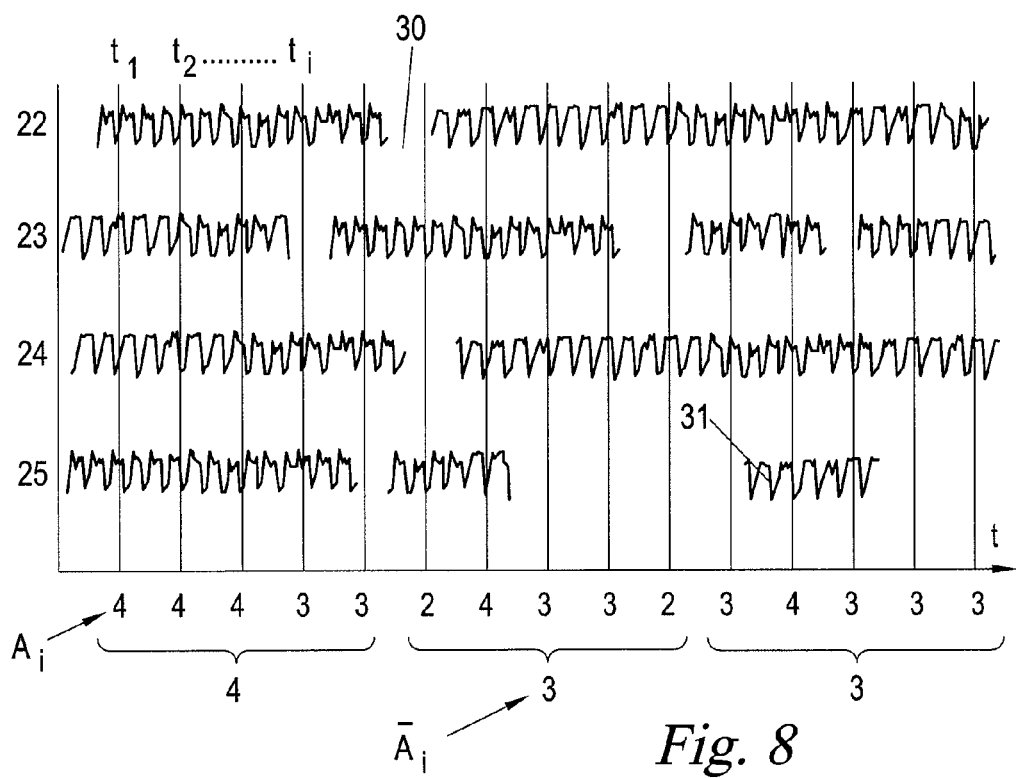
FIG. 8 shows signal patterns separated according to occupant obtained from the measurement signal of FIG. 7, according to some embodiments of the invention.

In the alternative embodiment of the OBU 12 of FIG. 4, for each seat 17 of the vehicle 2 (or for different groups of seats) the radar 13 has its own respective transceiver antenna 26 directed onto this seat to immediately generate a measurement signal separated according to occupant, i.e. a multi-track measurement signal, as already shown in FIG. 8 in the form of the measurement signal tracks 22-25.

The tracks 22-25 of the measurement signal 21 separated according to occupant are then analysed by the evaluation device 19 of the OBU 12 for time coincidence, i.e. occurring simultaneously at specific observation times $t_1, t_2, \ldots$, in general $t_i$. The number $A_i$ of the simultaneously occurring signal patterns 22-25 detected at a specific observation time $t_i$ is counted and is indicated in FIG. 8 under the respective observation times $t_i$.

Measurement errors, occlusions, uncertainties in correlation etc. can lead to interruptions or "misfires" 30, which can result in an occupant number $A_i$ that is temporarily too low. Conversely, scatter or incorrect measurements e.g. of occupants of adjacent vehicles, passers-by etc. can result in briefly emerging signal patterns 31 and too high a count value $A_i$. Therefore, the count values $A_i$ from multiple consecutive observation times $t_i$ are preferably averaged over an observation period to obtain averaged occupant numbers $\overline{A}_i$.

Averaged relative speeds of the occupants 16 in relation to the OBU 12 can also be determined from the signal patterns 20-25 attributable to the movements of the occupants 16 (or parts of their bodies). When determining the count values $A_i$ or $\overline{A}_i$, only those signal patterns 22-25 that indicate no relative speed of the occupant 16 causing the respective signal pattern in relation to the OBU 12 are preferred. As a result, the instances of occupants of adjacent vehicles being counted by mistake can be substantially reduced, since—in an observation period covering multiple observation times $t_i$—these generally have a relative speed significantly different from zero, i.e. a relative speed in relation to the OBU 12 that exceeds a threshold.

The count values $A_i$ or $\overline{A}_i$ are then used to calculate toll data dependent thereon in the OBU 12, e.g. a toll charge, which decreases with increasing occupant number and vice versa.

The thus calculated occupant number-dependent toll data can be stored in a memory of the OBU 12 for readout and evaluation at a later time or may be transmitted via a transceiver 32 of the OBU 12 to the next closest radio beacon 6 for further calculation in the road toll system 1.

Moreover, the OBU 12 can be equipped with a position determination system 33, for example a satellite navigation receiver, in particular a GPS receiver, for determination of its own position. As a result, the observation time or times $t_i$ can be selected or started in a position-dependent manner, i.e. when the vehicle 2, 3 reaches a predefined geographical position. Such a geographical position can be a predefined counting point, for example, at which the occupant number is to be determined, a virtual counting location as it were, or a favourable counting opportunity in a separation lane for single vehicles, on which the vehicles travel at a distance one behind the other, so that the risk of also counting occupants from foreign vehicles there is reduced.

A further possibility is that the speed of the vehicle 2, 3 is measured using its position determination system 33 (or an alternative speed measuring unit) and acceleration phases of the vehicle 2, 3 selected for the observation times $t_i$ are determined from said speed. In such acceleration phases it is unlikely that the occupants of the vehicle 2, 3 have the same relative speeds as occupants of surrounding third-party vehicles, which as a general rule seldom accelerate in the same manner, and in association with consideration of the relative speeds of the occupants forming the basis of the signal patterns 22-25 this in turn results in occupants from third-party vehicles being effectively excluded from the count values $A_i$, $\overline{A}_i$.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. An onboard unit for charging occupant number-dependent tolls for a vehicle in a road toll system, comprising:
a Doppler radar or ultra-wideband (UWB) impulse radar directed onto the vehicle interior for measuring movements and generating at least one measurement signal representing the movements; and
an evaluation device configured to detect signal patterns in the at least one measurement signal that are typical for heart or respiratory activity of an occupant, to count the signal patterns which occur simultaneously at an observation time, to calculate toll data as a function of a count value of the signal patterns, and to take only those signal patterns into account for the count value of the signal patterns during counting that indicate no speed of the occupant causing the respective signal pattern relative to the onboard unit, on an average over multiple observation times.

2. The onboard unit according to claim 1, wherein the evaluation device is further configured to average the count values of multiple consecutive observation times to form a mean value, and to calculate the toll data as a function of the mean value.

3. The onboard unit according to claim 1, wherein the onboard unit has a position determination device to start the observation time or times of the evaluation device when the vehicle reaches a predetermined position.

4. The onboard unit according to claim 1, wherein an antenna characteristic of the Doppler radar or UWB impulse radar is matched to the vehicle interior.

5. The onboard unit according to claim 1, wherein for each seat of the vehicle the
Doppler radar or UWB impulse radar has a transceiver antenna that is directed thereto for generating a respective measurement signal, in which the signal patterns can be detected separately.

6. The onboard unit according to claim 1, wherein the Doppler radar or UWB impulse radar has a joint transceiver antenna for an entire vehicle interior for generating a joint measurement signal, in which simultaneously occurring signal patterns can be detected by a correlation comparison with predetermined reference signal patterns.

7. The onboard unit according to claim 1, further comprising a transceiver connected to the evaluation device for communicating the toll data calculated dependent on the number of occupants, from the onboard unit to at least one radio beacon of the road toll system.

8. A method for charging an occupant number-dependent toll for vehicles in a road toll system, the method comprising:
directing a Doppler radar or ultra-wideband (UWB) impulse radar onto an interior of a vehicle to measure movements therein and to generate at least one measurement signal representing the movements;
detecting signal patterns in the at least one measurement signal that are typical for heart or respiratory activity of an occupant;
counting the signal patterns which occur simultaneously at an observation time by one or more processors, wherein during counting, only signal patterns with an average over multiple observation times indicating no speed of the occupant causing the respective signal pattern relative to the onboard unit are taken into account for the count value of the signal patterns; and
calculating toll data as a function of a count value of the signal patterns time by one or more processors.

9. The method according to claim 8, wherein the count values of multiple consecutive observation times are averaged to form a mean value and the toll data are calculated from the mean value.

10. The method according to claim 8, wherein the observation time or times are started when the vehicle reaches a predetermined position.

11. The method according to claim 8, wherein the speed of the vehicle is measured, acceleration phases are determined from the measured speed, and the observation times are selected in acceleration phases of the vehicle.

12. The method according to claim 8, further comprising transmitting the toll data to the road toll system.

13. The method according to claim 8, wherein the method is used for charging tolls for vehicles on high occupancy vehicles (HOV) lanes.

* * * * *